United States Patent
Ross et al.

(10) Patent No.: US 9,719,605 B2
(45) Date of Patent: Aug. 1, 2017

(54) VALVE UNIT WITH AXIAL PRESSURE MEDIUM UNIT

(71) Applicant: GSchaeffler Technologies GmbH & Co. KG, Herzogenaurach (DE)

(72) Inventors: Christoph Ross, Stegaurach (DE); Alexander Backer, Grafenberg (DE); Josef Groschel, Gossweinstein (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 57 days.

(21) Appl. No.: 14/407,533

(22) PCT Filed: Apr. 4, 2013

(86) PCT No.: PCT/EP2013/057056
§ 371 (c)(1),
(2) Date: Dec. 12, 2014

(87) PCT Pub. No.: WO2013/185943
PCT Pub. Date: Dec. 19, 2013

(65) Prior Publication Data
US 2015/0184765 A1    Jul. 2, 2015

(30) Foreign Application Priority Data
Jun. 13, 2012  (DE) .................. 10 2012 209 859

(51) Int. Cl.
*F16K 15/02* (2006.01)
*F16K 15/06* (2006.01)
*F01L 1/344* (2006.01)

(52) U.S. Cl.
CPC ............ *F16K 15/066* (2013.01); *F01L 1/344* (2013.01); *F16K 15/063* (2013.01);
(Continued)

(58) Field of Classification Search
CPC ............ F01L 1/344; F01L 2001/34426; F01L 2001/3444; Y10T 137/7922; F16K 15/063
See application file for complete search history.

(56) References Cited

U.S. PATENT DOCUMENTS

2004/0226526 A1    11/2004  Palesch et al.
2007/0095315 A1    5/2007   Hoppe et al.
(Continued)

FOREIGN PATENT DOCUMENTS

CN    101922322 A    12/2010
CN    102482958 A    5/2012
(Continued)

OTHER PUBLICATIONS

EPO translation pp. 1-5 printed on Mar. 31, 2016.*

*Primary Examiner* — Craig Schneider
*Assistant Examiner* — P. Macade Nichols
(74) *Attorney, Agent, or Firm* — Volpe and Koenig, P.C.

(57) ABSTRACT

A valve element for a hydraulic control device, in particular valve sleeve (1) or valve housing for a control valve on internal combustion engines or transmissions of motor vehicles, wherein the valve element has a displaceable control piston (2) which is subjected to load on one side by a spring (3) which is supported on a spring support (4) which is fixed to the valve element. The spring support (4) has at least one opening (7) which is connected to a pressure medium line, and the pressure medium line is in the form of a pressure medium inlet line. An axial filter (8) is arranged at the opening (7) of the spring support (4) and/or the opening (7) of the spring support (4) is provided with a check valve (9).

10 Claims, 3 Drawing Sheets

(52) U.S. Cl.
CPC ............... *F01L 2001/3444* (2013.01); *F01L 2001/34426* (2013.01); *Y10T 137/7838* (2015.04); *Y10T 137/7922* (2015.04)

(56) References Cited

U.S. PATENT DOCUMENTS

| | | | |
|---|---|---|---|
| 2011/0174253 A1 | 7/2011 | Hoppe et al. | |
| 2012/0055427 A1* | 3/2012 | Chen | F01L 1/3442 123/90.15 |
| 2012/0145105 A1 | 6/2012 | Bayrakdar | |
| 2013/0092113 A1 | 4/2013 | Bohner et al. | |
| 2013/0112163 A1 | 5/2013 | Bayrakdar | |
| 2013/0118622 A1 | 5/2013 | Patzold et al. | |

FOREIGN PATENT DOCUMENTS

| | | | |
|---|---|---|---|
| DE | 102005052481 A1 | 5/2007 | |
| DE | 102007058491 | 6/2009 | |
| DE | 102010032251 A1 | 1/2012 | |
| DE | WO 2012007240 A1 * | 1/2012 | ............ F01L 1/3442 |
| DE | 102011084059 A1 | 4/2013 | |
| WO | 2006127347 | 11/2006 | |
| WO | 2012007240 | 1/2012 | |

\* cited by examiner

VALVE UNIT WITH AXIAL PRESSURE MEDIUM UNIT

FIELD OF THE INVENTION

A valve element for a hydraulic control device, in particular valve sleeve or valve housing for a control valve on the internal combustion engines or transmissions of motor vehicles, wherein the valve element has a displaceable control piston which is subjected to load on one side by a spring which is supported on a spring support which is fixed to the valve element, wherein the spring support has at least one opening which is connected to a pressure medium line.

BACKGROUND

A valve element of said type which is in the form of a valve sleeve is known from DE-10 2007 058 491 A1. This valve element is a constituent part of a control valve for the variable adjustment of the timing of gas exchange valves of a reciprocating-piston internal combustion engine. The valve element is screwed into a camshaft which is of hollow form at the end, and said valve element, in conjunction with the control pistons, controls the pressure medium inlet, the control lines that lead to a camshaft adjustment unit, and the pressure medium outlet that is connected by the opening in the spring support to a pressure medium line.

It is a problem that dirt particles can ingress into the control device or valve unit and can impede or block the movement of the valve piston in the valve sleeve.

It is a further problem that pressure medium can flow back out of the control device or valve unit in an undesired manner, and that an evacuation of the lines and of the adjustment chambers in the camshaft adjuster causes an undesired adjustment of the camshaft adjuster of the internal combustion engine or some other adjustment of a transmission.

SUMMARY

It is therefore an object of the invention to improve a valve element, in particular a valve sleeve or a valve housing of a control valve for different applications, such that the fouling of the valve element, of the control piston or of the entire valve unit, and/or evacuation of the pressure medium, are eliminated, wherein it is the intention for this to be realized with simple and inexpensive means.

The object of the invention is achieved in that the pressure medium line is in the form of a pressure medium inlet line and in that an axial filter is arranged at the opening of the spring support.

It is alternatively or additionally possible for the opening of the spring support to be equipped with a check valve.

Since this refinement of the valve element or of the valve unit is independent of the usage situation, it may be used in any desired valve units of hydraulic control devices.

It is expressly pointed out that the valve element need not be a separate component, such as a valve sleeve, but may also be a valve housing. This is the case, inter alia, because, as will be discussed in more detail below, the axial filter and the check valve are arranged within the inner diameter of the valve sleeve or of a valve housing and therefore corresponds only to the internal bore that is indeed provided on a valve sleeve, a valve housing, or a corresponding component.

If the valve element is in the form of a valve sleeve, it may be equipped as a central screw or with a thread formed on the outside of the sleeve, and may correspond with a corresponding internal thread on a camshaft and fix a further component.

In a further refinement of the invention, it is proposed that the spring support and the axial filter and/or the check valve are formed as a structural unit, wherein the spring support may be in the form of a plastics injection-molded part which has integrated therein the filter fabric and/or the check valve. This yields a simple and inexpensive refinement. In this way, the spring support can be elastically flexible, such that, on the spring support, there may be provided a projection or a bead which corresponds with a recess or a groove on the internal wall of the valve element. In this way, the spring support can be pressed into the bore until the spring support hooks into the recess or the groove.

The spring that interacts with the control piston may be fixed directly to the spring support, for example by way of an internal bead. The spring support may however also have a support plate which is in turn supported on the spring support or fastened to the spring support, in particular fastened thereto by insert molding.

The check valve preferably has a disk with an aperture opening and a movably articulated check plate, the valve cover of which projects over the valve opening. It is also possible for the disk and the check plate to be supported on the spring support or fastened to the spring support, in particular in turn by insert molding.

The arrangements according to the invention yield a spring support which serves firstly as a spring support but secondly also the axial filter and/or check valve, which additionally has a support plate, wherein an integral component is formed in particular owing to the production as an insert-molded unit. Here, the axial filter, the check valve, and the support plate are installed in the stated sequence as viewed in the flow direction of the pressure medium.

BRIEF DESCRIPTION OF THE DRAWINGS

For further explanation of the invention, reference is made to the drawings which illustrate exemplary embodiments of the invention in simplified form and in which.

DETAILED DESCRIPTION OF THE PREFERRED EMBODIMENTS

Figure 1:
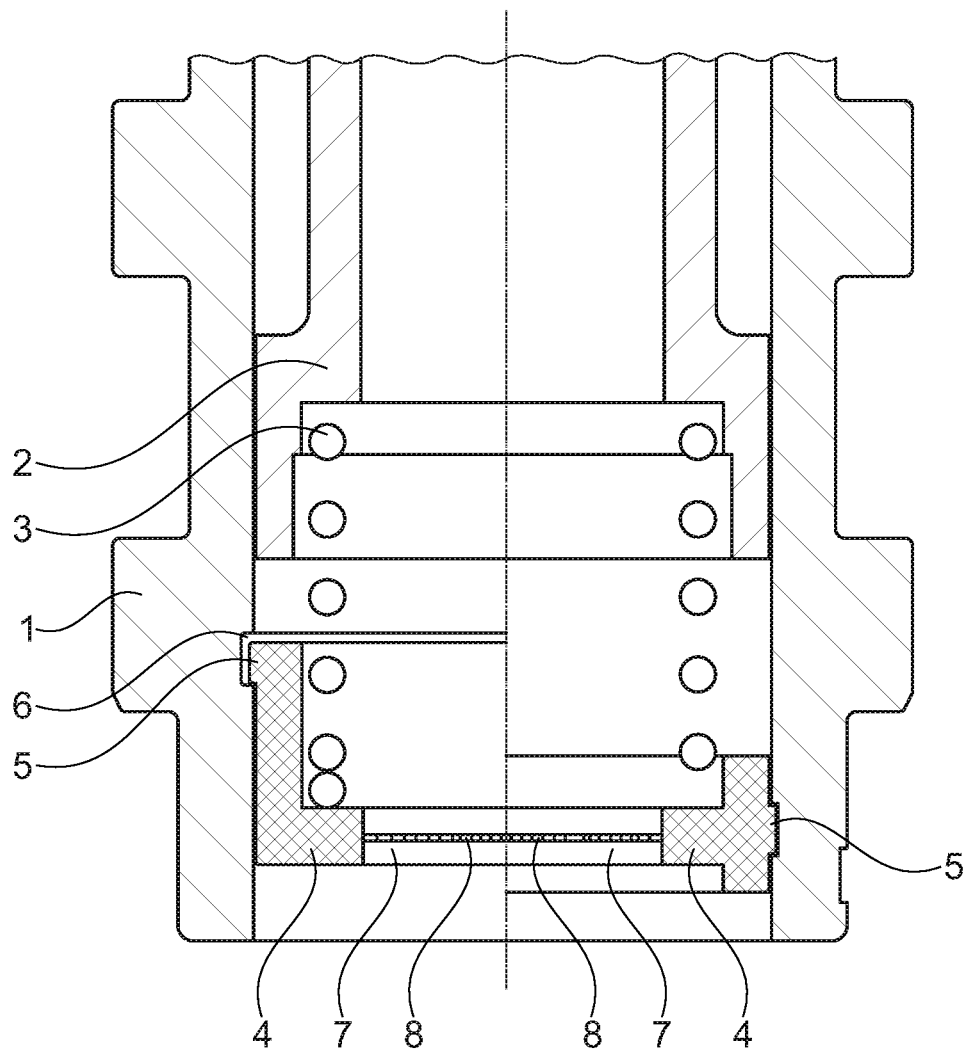
FIG. 1: shows partial sections through a valve sleeve and a control piston with different designs of the spring support in the left-hand and right-hand section halves.

In FIGS. 1 to 5, where illustrated in detail, 1 denotes a valve sleeve in which a control piston 2 is arranged in axially displaceable fashion. The control piston 2 interacts with a spring 3 which is supported on a spring support 4. The spring support 4 has a bead 5 which corresponds with a groove 6 on the internal wall of the valve sleeve 1 and thus ensures secure retention in the valve sleeve 1. The spring support 4 is produced from an elastic material, in particular plastic, and preferably produced by insert molding. In this way, the spring support 4 can be pushed into and locked in the central opening of the valve sleeve 1, such that simple installation is possible and good fixing of the spring support 4 in the valve sleeve 1 is obtained.

In FIG. 1, an axial filter 8 is installed in the opening 7 of the spring support 4, which axial filter prevents the ingress of dirt particles into the control piston/valve sleeve region. Here, the filter fabric is integrated into the plastics spring support during the molding process.

Figure 2:
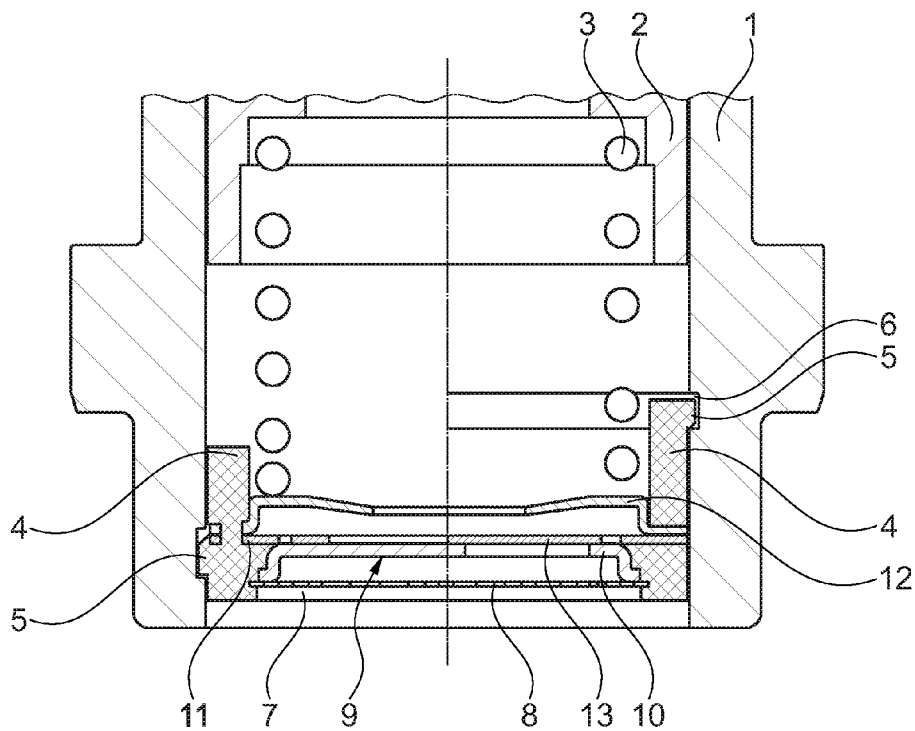
FIG. 2: shows partial sections corresponding to FIG. 1, with differently designed spring supports and integrally fastened axial filter, check valve, and support plate.

In FIG. 2, in addition to the axial filter 8, a check valve 9 with disk 10 and check plate 11 is also installed, said check valve likewise being integrated into the spring support 4 produced from plastic. Provided subsequently to the check valve 9 is a support plate 12 with a central opening, on which support plate the spring 3 is supported. The support plate 12 is likewise integrated into the spring support 4. A unit is thus created which is comprised of the spring support 4, the axial filter 8, the check valve 9, and the support plate 12.

Figure 3:
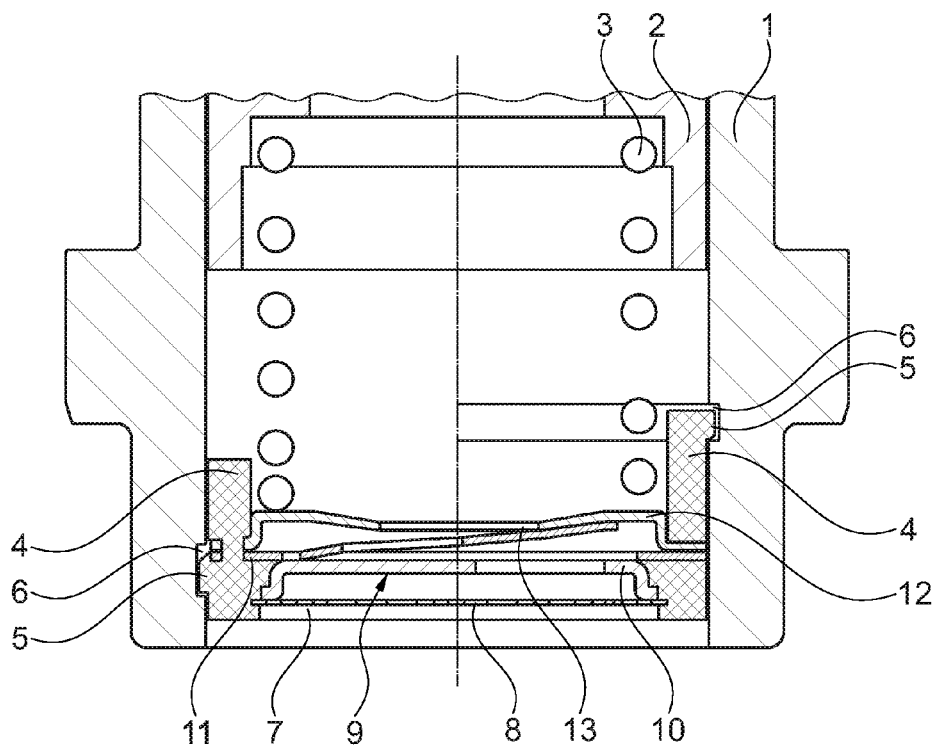
FIG. 3: shows partial sections corresponding to FIG. 2, with the check valve open.

As can also be seen from FIG. 3, the support plate 12 serves as an abutment for a valve cover 13 of the check plate 11.

Figure 4:
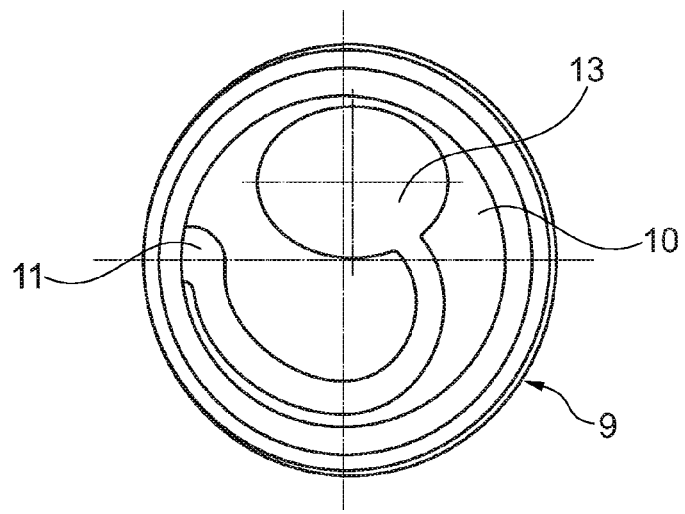
FIG. 4: shows a plan view of a check valve.

It can be seen from FIG. 4 that the valve cover 13 of the check plate 11 is movably articulated by way of a sheet-metal strip, wherein the sheet-metal strip may be fastened to the disk 10 or may be independently integrated in the spring support 4.

Figure 5:
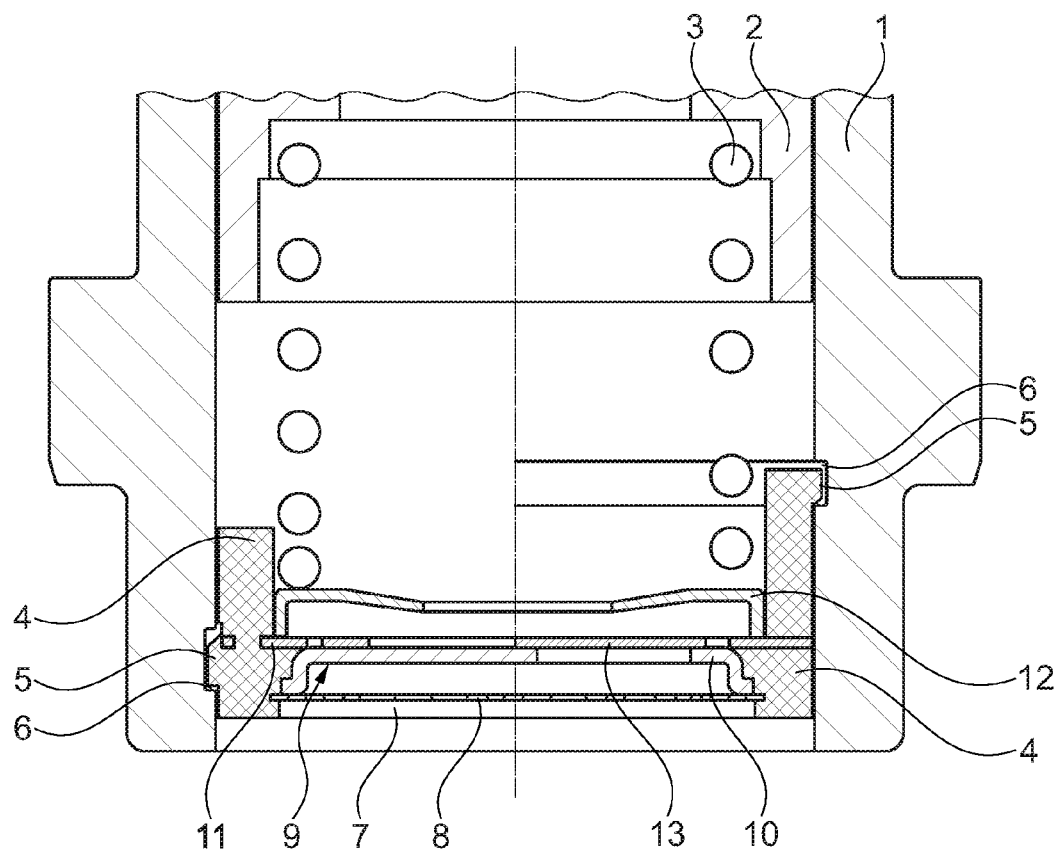
FIG. 5: shows partial sections corresponding to FIG. 2, with a separately installed support plate.

By contrast to the refinements of FIGS. 2 and 3, the support plate 12 as per FIG. 5 is in the form of a separate component and installed into the spring support 4. The support plate 12 is supported on the check valve 9, which is integrated into the spring support 4 and which thus offers secure retention.

LIST OF REFERENCE NUMERALS

1 Valve sleeve
2 Control piston
3 Spring
4 Spring support
5 Bead
6 Groove
7 Opening
8 Axial filter
9 Check valve
10 Disk
11 Check plate
12 Support plate
13 Valve cover

The invention claimed is:

1. A valve element for a hydraulic control device, for a control valve on internal combustion engines or transmissions of motor vehicles, the valve element comprising a displaceable control piston, a spring which is directly supported against a spring contact surface defined by a spring support which is fixed to the valve element, the spring applying a force on one side of the control piston, the spring support has at least one opening which is connected to a pressure medium line and is defined radially inwardly from the spring contact surface, the pressure medium line is a pressure medium inlet line, and an axial filter is arranged directly in the at least one opening of the spring support, the axial filter is arranged perpendicular to a longitudinal axis of the spring, and the axial filter is integrally formed with the spring support.

2. The valve element as claimed in claim 1, wherein the spring support and the axial filter are formed as a structural unit.

3. The valve element as claimed in claim 1, wherein the spring support is a plastics injection-molded part which has integrated therein a filter fabric of the axial filter.

4. The valve element as claimed in claim 1, wherein the spring support has at least one projection on an outer circumference thereof, and in that the at least one projection is placeable in contact with a recess on an inner circumference of a valve sleeve.

5. The valve element as claimed in claim 1, wherein the spring support has a support plate which is connected to the spring and which is supported on the spring support.

6. The valve element as claimed in claim 1, wherein the spring support has a support plate which is connected to the spring and which is fixed to the spring support.

7. The valve element as claimed in claim 1, further comprising a check valve provided for the at least one opening, and the axial filter, the check valve, and the support plate are installed in sequence as viewed in a flow direction of the pressure medium.

8. The valve element as claimed in claim 1, wherein the valve element is a valve sleeve or a valve housing.

9. The valve element as claimed in claim 6, wherein the spring is integrally fixed to the spring support by insert molding.

10. The valve element as claimed in claim 1, wherein the axial filter engages an entire radially inner periphery of the at least one opening.

* * * * *